(12) United States Patent
Gorecki et al.

(10) Patent No.: US 7,248,640 B2
(45) Date of Patent: Jul. 24, 2007

(54) SYSTEM AND METHOD FOR PROVIDING SLICER LEVEL ADAPTION

(75) Inventors: James Gorecki, Hillsboro, OR (US); David A. Martin, Portland, OR (US); Yaohua Yang, West Linn, OR (US)

(73) Assignee: Synopsys, Inc., Mountian View, CA (US)

( * ) Notice: Subject to any disclaimer, the term of this patent is extended or adjusted under 35 U.S.C. 154(b) by 777 days.

(21) Appl. No.: 10/222,073

(22) Filed: Aug. 16, 2002

(65) Prior Publication Data

US 2003/0035497 A1 Feb. 20, 2003

Related U.S. Application Data

(60) Provisional application No. 60/313,455, filed on Aug. 20, 2001, provisional application No. 60/313,214, filed on Aug. 17, 2001.

(51) Int. Cl.
*H04L 25/06* (2006.01)
*H04L 25/34* (2006.01)

(52) U.S. Cl. .................... 375/287; 375/317
(58) Field of Classification Search ............... 375/286, 375/287, 317
See application file for complete search history.

(56) References Cited

U.S. PATENT DOCUMENTS 5,243,625 A * 9/1993 Verbakel et al. ............ 375/317
6,169,767 B1 1/2001 Strolle et al. ............... 375/302
6,600,780 B1 * 7/2003 Wang et al. ................. 375/233
2002/0196510 A1 * 12/2002 Hietala et al. .............. 359/189

FOREIGN PATENT DOCUMENTS

WO   WO 97/34397   9/1997
WO   WO 00/16525   3/2000

OTHER PUBLICATIONS

"IC-Friendly Line Codes for Direct-Conversion Receivers", by Dongling Pan et al., Radio and Wireless Conference, 2000 IEEE Sep. 10-13, XP010521029, pp. 79-81.
"Binary Code Suitable for Line Transmission", by Griffith J M, Electronic Letters, IEE Stevenage, GB, vol. 5, No. 4, Feb. 20, 1969, XP000761084, pp. 79-81.

* cited by examiner

*Primary Examiner*—David B. Lugo
(74) *Attorney, Agent, or Firm*—Park, Vaughan & Fleming, LLP (57) ABSTRACT

The present invention relates in general to a method, apparatus, and article of manufacture for providing high-speed digital communications through a communications channel. In one aspect, the present invention employs an automatic slicer level adaption to enhance the performance of a high speed communications system.

11 Claims, 7 Drawing Sheets

SYSTEM AND METHOD FOR PROVIDING SLICER LEVEL ADAPTION

CROSS-REFERENCE TO RELATED APPLICATIONS

This application claims priority to U.S. Provisional Patent Application Ser. No. 60/313,455, entitled "Automatic Slicer Level Adaption", filed Aug. 20, 2001, and U.S. Provisional Application Ser. No. 60/313,214, entitled "Transceiver Apparatus and Method", filed Aug. 17, 2001. The contents of these provisional applications are incorporated, in their entirety, by reference herein.

This application is related to U.S. Provisional Patent Application Ser. No. 60/313,454, entitled "Transceiver System for High Speed Digital Signaling", filed Aug. 20, 2001; U.S. Provisional Patent Application Ser. No. 60/313,456, entitled "Variable Rate Sub-Channel Using Block Code RDS", filed Aug. 20, 2001; U.S. Provisional Patent Application Ser. No. 60/313,478, entitled "Variable Delay FIR Equalizer for Serial Baseband Communications", filed Aug. 20, 2001; U.S. Provisional Patent Application Ser. No. 60/313,477, entitled "Crosstalk Management for High-Speed Signaling Links", filed Aug. 20, 2001; and U.S. Provisional Patent Application Ser. No. 60/313,476, entitled "Method and Apparatus for Encoding and Decoding Digital Communications Data", filed Aug. 20, 2001. The aforementioned applications are hereby incorporated by reference herein.

This application is also related to non-provisional patent applications that claim priority to one or more of the above-referenced provisional patent applications. These non-provisional patent applications are entitled "System and Method for High Speed Digital Signaling", filed Aug. 16, 2002(application Ser. No. 10/222,122); "System and Method for Embedding a Sub-Channel in a Block Coded Data Stream", filed Aug. 16, 2002(application Ser. No. 10/222,071); "System and Method for Providing Variable Delay FIR Equalizer for Serial Baseband Communications", filed Aug. 16, 2002(application Ser. No. 10/222,166); "System and Method for Providing Crosstalk Management for High-Speed Signaling Links", filed Aug. 16, 2002(application Ser. No. 10/222,072); and "Method and Apparatus for Encoding and Decoding Digital Communications Data", filed Aug. 16, 2002 (application Ser. No. 10/222,254). The aforementioned non-provisional patent applications are hereby incorporated by reference, in their entirety, herein.

BACKGROUND OF THE INVENTION

This application relates in general to a method, apparatus, and article of manufacture for providing high-speed digital communications through a communications channel, and more particularly to a method, apparatus, and article of manufacture for providing slicer level adaption for a high-speed digital communications system.

Digital communications systems are continuously increasing the transfer rate at which data is transmitted between devices through a communications channel, for example, a backplane. One technique for increasing the data transfer rate is to encode the data prior to transmission. In this regard, there are a number of techniques for encoding data. Many of these techniques utilize different numbers of signals and modulation of symbols in order to increase the data transfer rate. One such method of modulating symbols is to use a multi-level pulse amplitude modulation (PAM-n) scheme that encodes a plurality of bits of data into or onto a single signal in which the symbols are represented as a set of signal levels between minimum and maximum signal levels.

In order to properly decode the received signal to thereby recover the digital representation of the data bits being transmitted, signal levels need to be set between the minimum and maximum signal levels that allow the transmitted symbol to be decoded properly. These are typically referred to as slicer levels.

In conventional systems, the slicer levels are an equal distance between adjacent signal levels. These levels are typically set during system design. As such, each signal level has an equal weight and is fixed. This slicer level scheme, however, may not provide a sufficient result from the perspective of a bit error rate of the system performance.

Accordingly, there exists a need to increase the performance of channel communications by, for example, providing a system and technique that includes an improved slicer level adjustment mechanism and technique.

SUMMARY OF THE INVENTION

The present invention relates in general to a method, apparatus, and article of manufacture for providing high-speed digital communications through a communications channel. In one aspect, the present invention employs an automatic slicer level adaption to enhance the performance of the system.

BRIEF DESCRIPTION OF THE DRAWINGS

In the course of the detailed description to follow, reference will be made to the attached drawings. These drawings show different aspects of the present invention and, where appropriate, reference numerals illustrating like structures, components and/or elements in different figures are labeled similarly. It is understood that various combinations of the structures, components and/or elements other than those specifically illustrated are contemplated and within the scope of the present invention.

DETAILED DESCRIPTION

In the following detailed description of exemplary embodiments of the invention, reference is made to the accompanied drawings, which form a part hereof, and which is shown by way of illustration. These embodiments are described in sufficient detail to enable those skilled in the art to practice the invention, and it is to be understood that other embodiments may be utilized, and other changes may be made, without departing from the scope of the present invention. The following description is, therefore, not to be taken in a limiting sense, and the scope of the present invention is defined by the appended claims.

Throughout the specification and claims, the following terms take the meanings explicitly associated herein, unless the context clearly dictates otherwise. The term "connected" means a direct connection between the items connected, without any intermediate devices. The term "coupled" means either a direct connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "module" means a circuit (whether integrated or otherwise), a group of such circuits, a processor(s), a processor(s) implementing software, or a combination of a circuit (whether integrated or otherwise), a group of such circuits, a processor(s) and/or a processor(s) implementing software.

Figure 1:
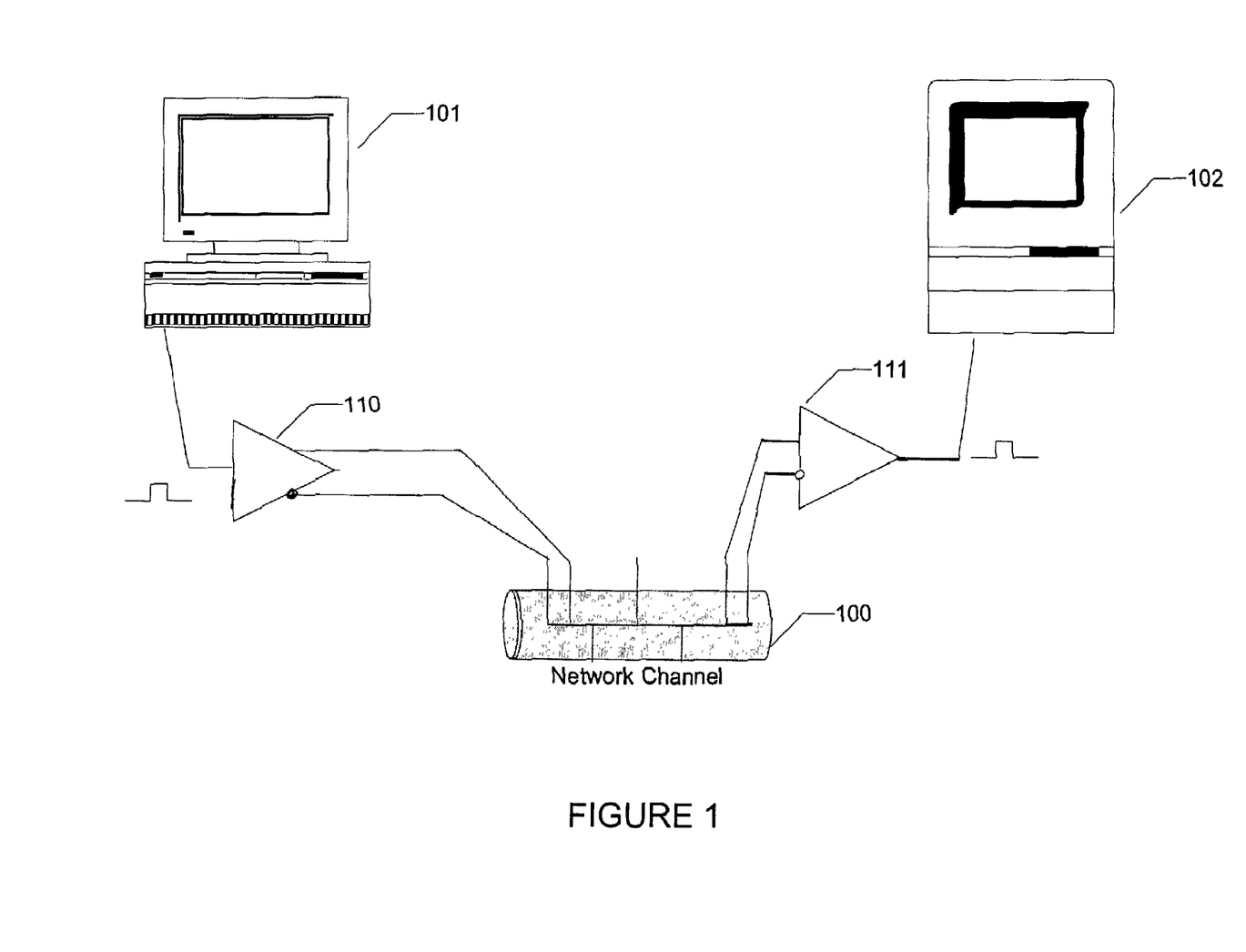
FIG. 1 illustrates an exemplary communications channel between two digital processing devices according to one embodiment of the present invention.

FIG. 1 illustrates an exemplary communications channel between two digital processing devices according to one embodiment of the present invention. Digital processing devices 101 and 102, such as personal computers, communicate with each other by transmitting digital signals through communications channel 100. In one embodiment, a digital representation of the data to be transmitted is encoded and transformed into an electronic signal capable of passing through communications channel 100. The electronic signal is transmitted by transmitter 110 to receiver 111. The received signal, which may be distorted relative to the signal transmitted into channel 100, is processed and decoded (by the receiver 111) to reconstruct a digital representation of the information sent by the transmitting or sending device (i.e., the transmitter 110).

The communications channel 100 may be, for example, constructed using one or more cables, wires, traces or the like, or may be part of a backplane, or may be a wireless communications medium through which the signal passes from transmitter 110 to receiver 111. One skilled in the art will recognize that any such communications media, when used in conjunction with a corresponding transmitter/receiver pair appropriate for a particular medium, may be used to construct a communications channel in accordance with the present invention. For example, other channels that may be implemented in the present invention include electronic, optical or wireless. Indeed, all types of channels of communication (i.e., communication channels), whether now known or later developed, are intended to be within the scope of the present invention.

Figure 2:
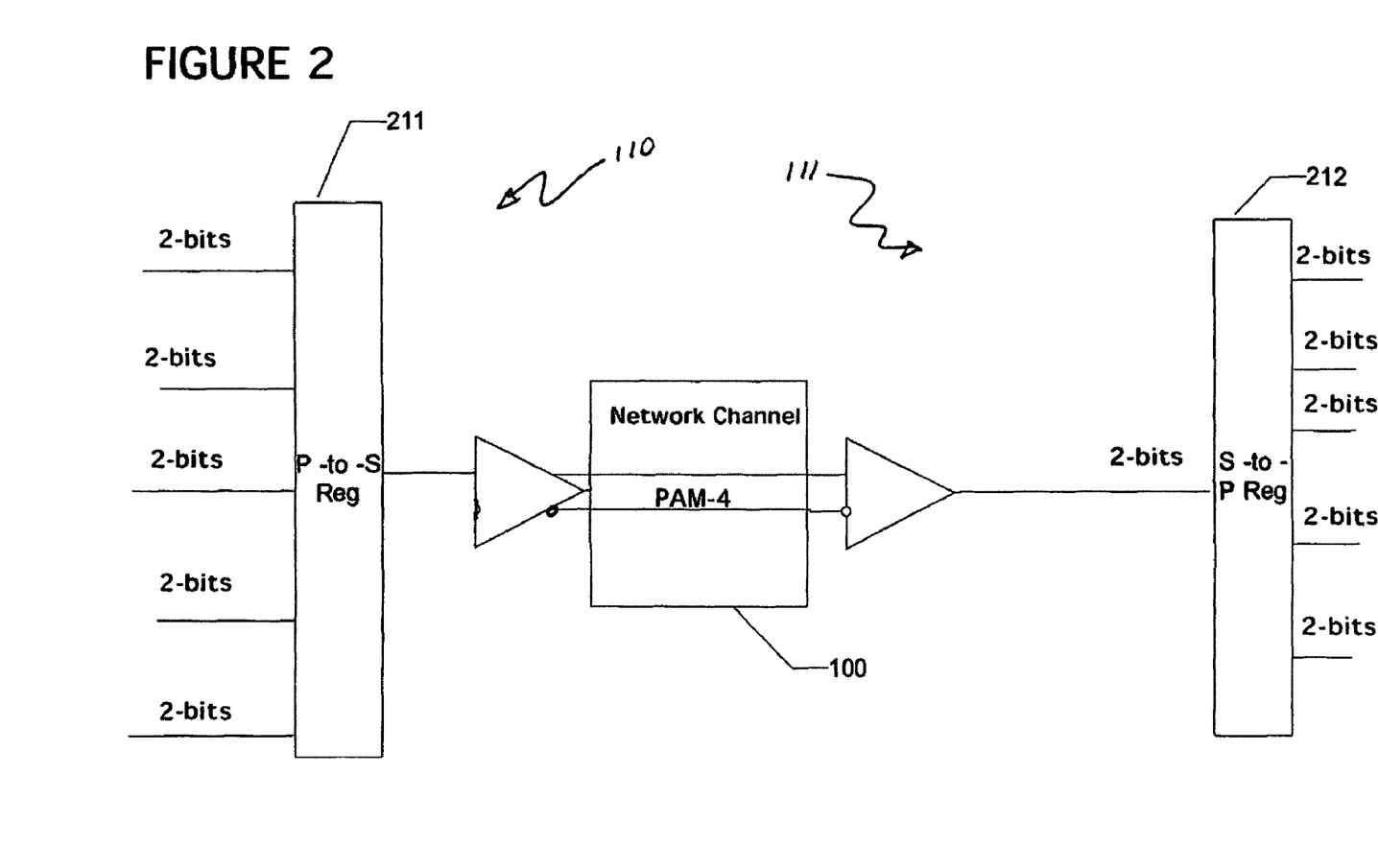
FIG. 2 illustrates an exemplary communications channel according to one embodiment of the present invention.

FIG. 2 illustrates an exemplary communications channel according to one embodiment of the present invention. The communications channel 100 enables or facilitates transmission of information between associated pairs of transmitters and receivers, for example, transmitter 110 and receiver 111. In one embodiment, transmitter 110 and receiver 111 employ a four level pulse amplitude modulated (PAM-4) communications technique to send two bits of data through channel 100. That is, the transmitter/receiver pair is used to send two bits of data for each symbol transmitted through channel 100. A ten bit word is loaded into parallel-to-serial register 211 with the output of the register being a two bit pair that is transmitted through the channel 100. Once received, the sequence of two bit codes are loaded into serial-to-parallel register 212 to reconstruct or decode the ten bit word.

Figure 3:
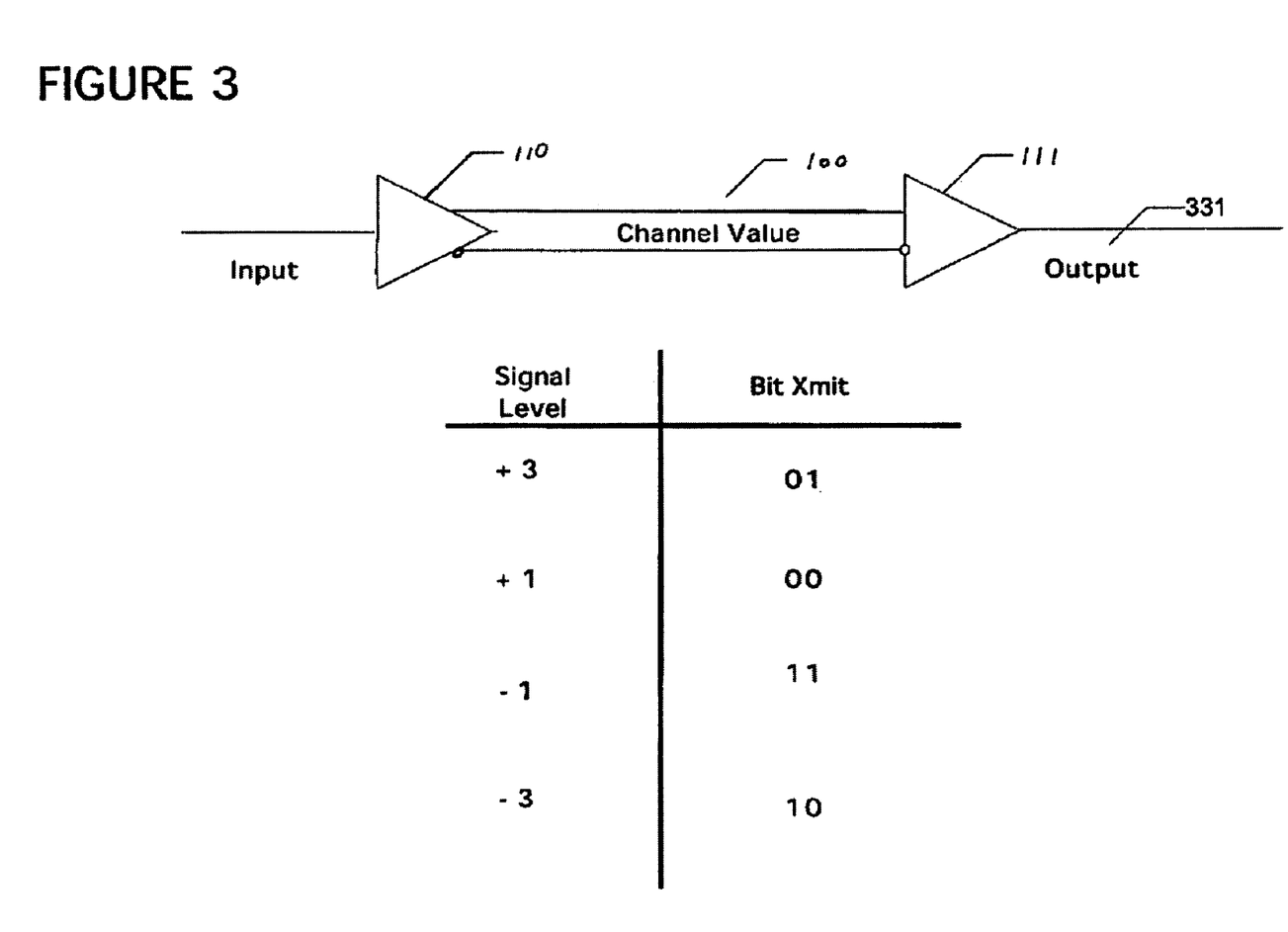
FIG. 3 illustrates a portion of a communications channel implementing PAM-4 symbol encoding according to one embodiment of the present invention.

With reference to FIG. 3, in one aspect of the present invention, the PAM-4 communications technique transmits one of four signal values from transmitter 110 to a receiver 111. The signal value represents a single communications symbol. The four signal values are used to encode the four possible combinations of values for two bits of digital data.

In operation, the data is sent through channel 100 by sending a sequence of symbols wherein each symbol is representative of two bits of data. The sequence of symbols is received by receiver 111, separated into two bit groups that are reconstructed as output data 331 to allow the digital representation of input data (into the channel) to be extracted as output data (from the channel).

The communications system typically includes many sets of unidirectional transmitter and receiver pairs connected to communications channel 100. These pairs simultaneously transmit data across channel 100 in both directions. Thus, from a system level perspective, there are many transmitter/receiver pairs in simultaneous operation, for example, eight or nine transmitter/receiver pairs communicating across a communications channel.

It should be noted that other communications mechanisms that use different encoding tables, other than four levels, may also be used. For example, PAM-5, PAM-8, PAM-16, CAP, wavelet modulation and other encoding rates such as 16B9Q or 9B5Q may be implemented in the present invention. The techniques described herein are in fact applicable to any and all modulation schemes, whether now known or later developed, including but not limited to PAM-4 encoding described herein.

Figure 4:
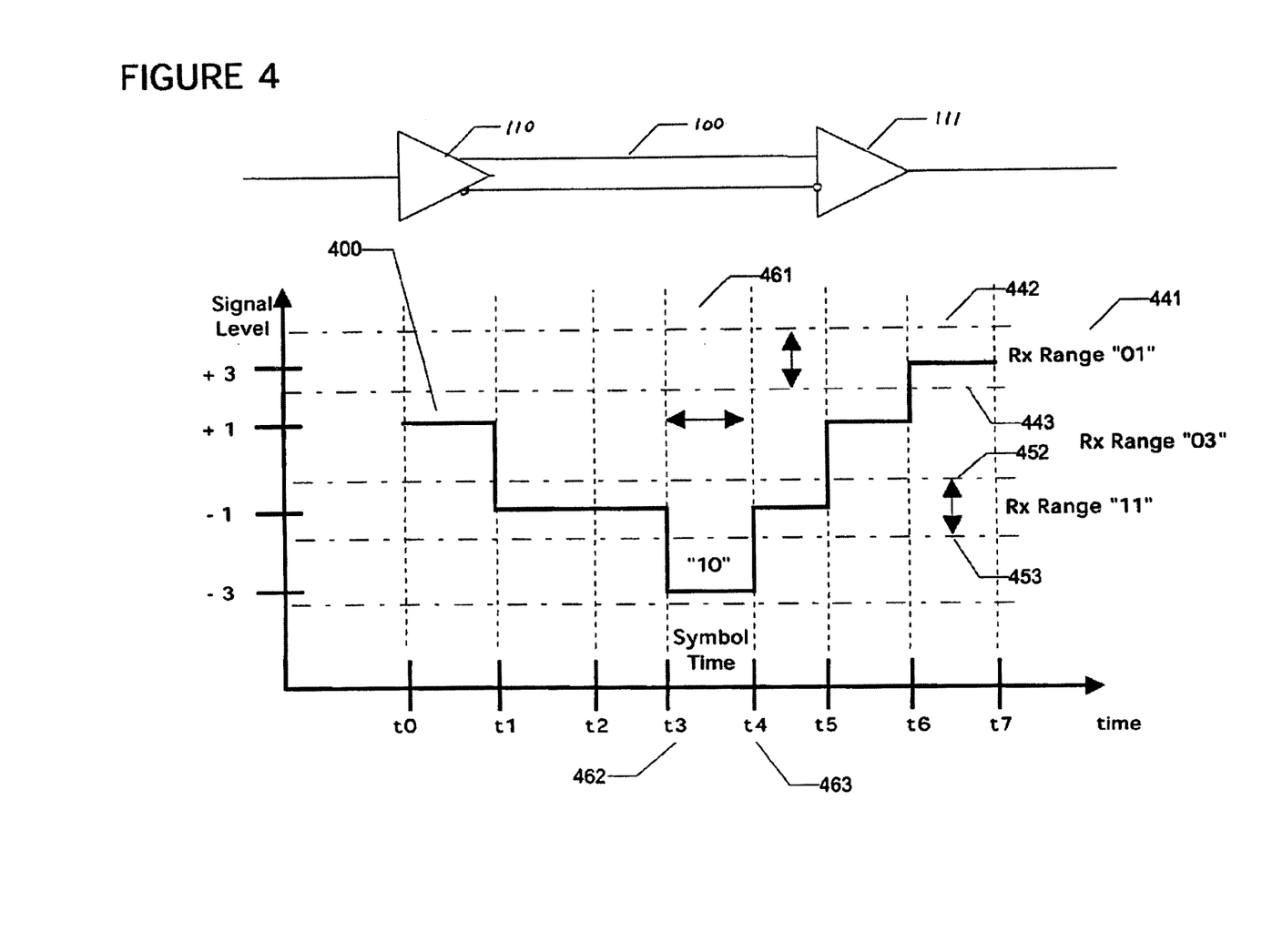
FIG. 4 illustrates an idealized time-varying communications signal for a portion of a communications channel according to one embodiment of the present invention.

FIG. 4 illustrates an idealized time-varying communications signal for a single line from a communications channel. As data passes from transmitter 110 to receiver 111, an idealized representation of the signal 400 is seen in or on channel 100. Two bits of data are sent during each symbol time period 461, which is defined to be a time period between a starting 462 and an ending 463 time for a symbol. The ending time 463 for a symbol is typically also the starting time for the next symbol. During a symbol time 461, a particular channel value is observable in the channel.

The transmitter 110 sends one of four signal values, i.e. +3, +1, −1 or −3, during each symbol time 461. The receiver 111 measures or observes the voltage during each symbol time period 461 to determine which of the four signal levels was sent by the transmitter 110. For example, at time 461, receiver 111 detects a symbol by detecting the voltage.

The receiver 111 determines or detects a particular symbol was transmitted when a voltage is detected between a particular maximum signal level and minimum signal level. These signal levels are typically centered around or on the particular symbol signal level. For example, if a bit pattern "01" is transmitted, a +3 signal voltage 441 is expected to be received. The receiver is expected to observe a signal level between a maximum value 442 and a minimum value 443 if the "01" bit pattern is to be recovered. Similar maximum value 452 and minimum value 453 are seen for a −1 signal level used for a bit pattern of "11".

It should be noted that the idealized time-varying waveform 400 does not illustrate the presence of any noise seen at the receiver. Additionally, the time-varying waveform shows instantaneous changes from one symbol voltage to a second symbol voltage at the start and end of a symbol time period 461. As symbol communication rates increase, both noise and the rise and fall times for the symbols may become significant factors that limit the rate at which data may be communicated.

Figure 5:
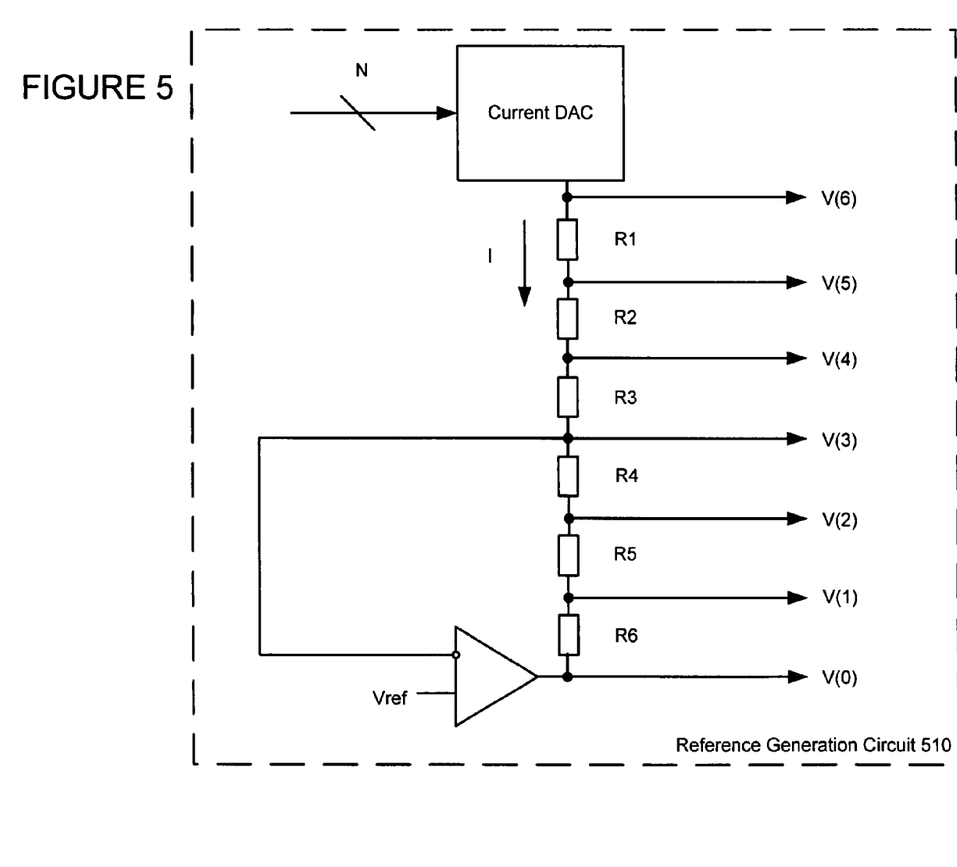
FIG. 5 illustrates an embodiment of a voltage reference generation circuit, used by or implemented in a receiver, according to one embodiment of the present invention.

FIG. 5 illustrates one embodiment of a reference generation circuit. The reference generation circuit 510 of FIG. 5 may be implemented in a receiver to recover the transmitted information. The reference generation circuit 510 of this embodiment may be employed to set the slicing levels for the receiver front end, for example, a receiver implemented in a system employing a PAM-4 technique.

With continued reference to FIG. 5, a set of resistors, R1-R6, are employed to obtain desired voltages between a maximum and minimum voltage level. In one embodiment, the circuit generates seven reference levels (V(0)-V(6)) for a seven level slicer. These voltages are "mapped" or correlated to the voltage levels in FIG. 3. For example, V(6) may be mapped to +3 (i.e., the maximum voltage level), V(5) to +2, V(4) to +1, V(3) to 0 (i.e., center or mid voltage level), V(2) to −1, V(1) to −2 and V(0) to −3 (i.e., the maximum voltage level).

Thus, in operation, levels V(5), V(3), and V(1) are used by the slicer to determine the value of a symbol. For example, if the signal that is sampled is greater than V(5)=2, the slicer determines that the sliced value was a +3. However, if the signal sample is greater than V(3)=0 and less than V(5)=2, then the slicer determines that the sliced value was a +1. Further, if the sliced sample is greater than V(1)=−2 and less than V(3)=0, then the slicer determines that the sliced value was a −1. Finally, if the sliced sample is less than V(1)=−2, then the slicer determines that the sliced value was a −3.

The other reference levels (i.e., V(0), V(2), V(4), V(6)) are set to additional slicing levels at the desired symbol values. These slicing levels are used to determine whether a given symbol is greater than or less than its desired value. For example, if a sliced value is greater than V(5) and greater than V(6), then the sliced value is determined to be a +3 and have a positive error (it was greater than the nominal signal level). If a sliced value is greater than V(5) and less than V(6) then the sliced value is determined to be a +3 and have a negative error (it was less than the nominal signal level).

This information may be employed in the adaptive equalization techniques described in the related applications. In addition, this information may be used to adjust the adaptive slicing levels as described below. Also, by changing the various resistor values R1-R6, other voltage V(0)-V(6) levels may be obtained. It should be noted that the operational amplifier maintains the common mode of the references, V(3), at Vref.

It should be further noted that more or less levels and other mappings or correlation relationships may be implemented. For example, the present invention may be implemented in any PAM system, including, for example, PAM-5, PAM-8 and PAM-16. Indeed, as mentioned above, the present invention may be implemented in CAP and wavelet modulation, among others.

Figure 6A:
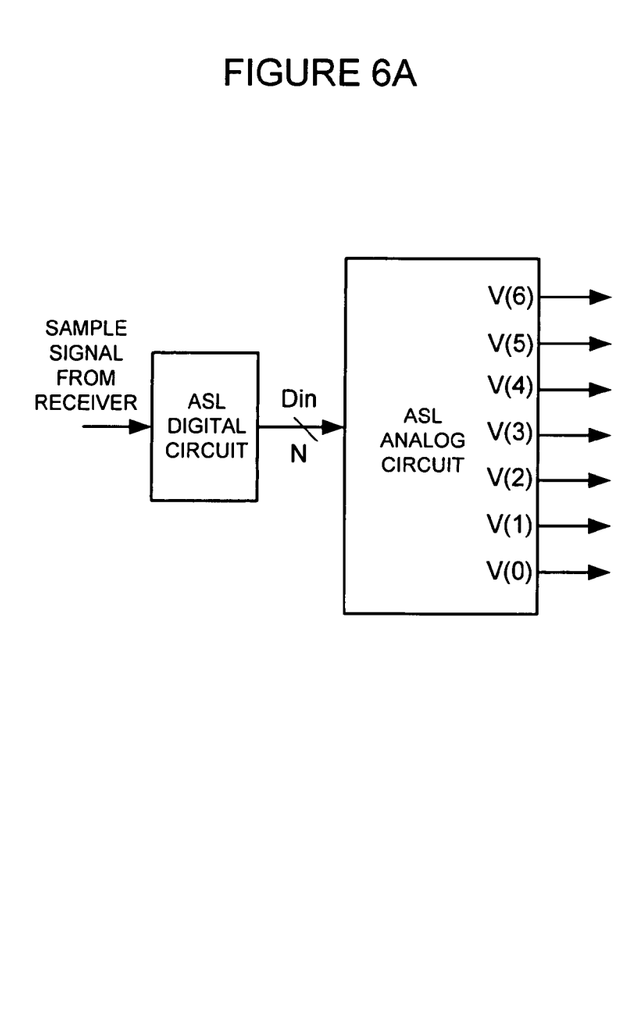
FIGS. 6A and 6B illustrate an embodiment of a reference generation circuit according to another aspect of the present invention.
Figure 6B:
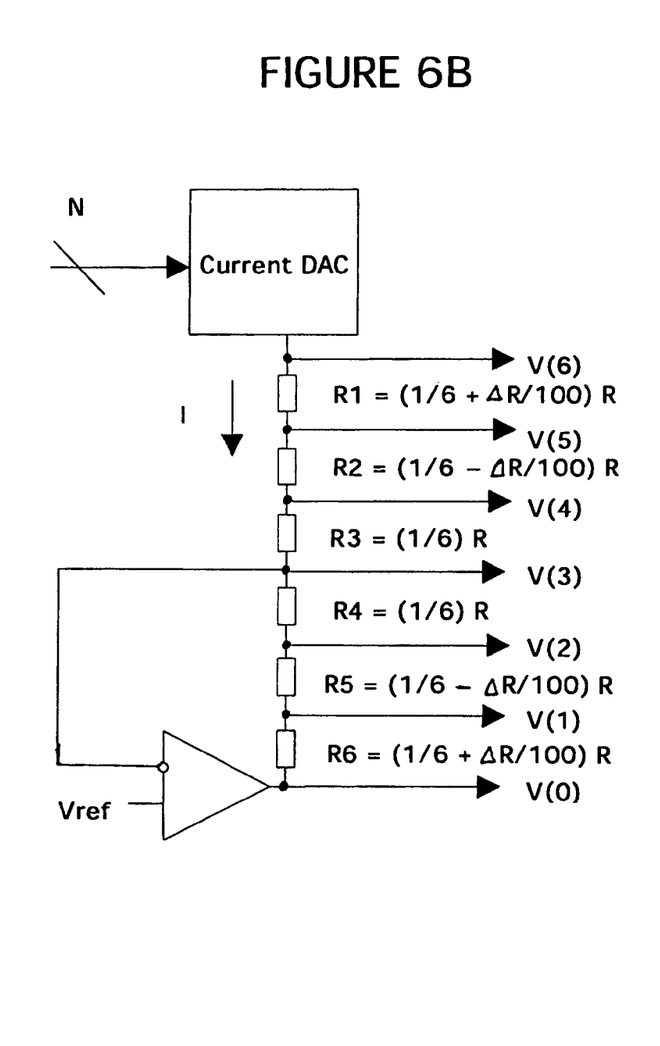

FIGS. 6A and 6B illustrate a reference generation circuit according to another embodiment of the present invention. The reference generation circuit of this embodiment may be particularly well suited to slice PAM-4 signals. This module may be implemented as part of the automatic slicer level (ASL) module. The ASL module is used to automatically adjust the analog voltage reference levels of a slicer. The inputs to the ASL module are measurements (digital values) from the slicer. The outputs of the ASL module are the analog reference voltages for the slicer.

In operation, a digital section of the ASL module accepts signals sampled by the receiver. These samples indicate the sign of the recovered data (sign[d(n)]) as measured from slicing levels set by reference voltages (V(1), V(3) and V(5)) and the sign of the error relative to the ideal symbol value (sign[e(n)]) as measured from slicing levels set by reference voltages (V(0), V(2), V(4) and V(6)). This information may be used to measure whether the slicing levels are optimally or properly set. For example, optimal or proper slicing levels may be set to have the levels for V(0), V(2), V(4) and V(6) set at the average values of the corresponding input four data signal levels.

In one embodiment, the measurement of where the slicing levels are located, positioned or selected with respect to the input signal levels is accomplished by multiplying sign[d(n)]×sign[e(n)] and summing these products over a sequence of many periods (for example, over a sequence of 64, 128, or 255 periods), where each period consists of a number of symbols (for example, five symbols). During this initialization, adjustment or calibration process, if this sum is positive, then the incoming signal level is larger than the slicing levels, and the reference voltages (V(0)-V(6)) should be increased. However, if the sum is negative, then the incoming signal level is smaller than the slicing levels, and the reference voltages (V(0)-V(6)) should be decreased.

In one preferred embodiment, the sign of the resulting sum is used to control a 10-bit up/down counter in the digital portion of the ASL as indicated below. With reference to FIG. 6A, with N=10, the 10-bit up/down counter forms the input, Din, for the ASL analog circuit that generates analog voltage reference levels. The 10-bit up/down counter varies the peak to peak range of the analog voltage reference levels over a range designed to span at least 250 mV to 500 mV across all process corners. Each digital step in the up/down counter corresponding to a 244 µV change in the peak-to-peak analog reference voltage range. This is represented in the following equation with $\mu_{asl}$=244 µV.

$$\mu_{asl} \times sgn[\Sigma sgn(e(n)) \cdot sgn(d(n))], \text{ for } n=1 \text{ to } N, \text{ where } N \geq 64, 128, \text{ or } 255.$$

It should be noted that other embodiments may be implemented to sum the value or some other mapping techniques of the summed values may be employed. In a preferred embodiment, each change to the digital control word is followed by a waiting period to allow the analog part of the ASL circuit time to settle to its new value before repeating the summation procedure. This adjustment or calibration process is called "ASL Adaption".

In a preferred embodiment, the adjustment or calibration process (i.e., the ASL Adaption process) runs continually and, as such, the ASL is always tracking or adapting to input signal amplitude(s). However, the ASL Adaption process may also be performed periodically or intermittently to, for example, reduce power consumption.

Moreover, the ASL Adaption process may be performed at or on a request of the user or a higher layer system function. In this regard, the process of adapting the ASL to, for example, input signal amplitude(s) may be enable or disabled based on a number of considerations, for example, power consumption.

The ASL Adaption process may also be performed at startup during an initial adjustment or calibration process. This process may be part of a system initialization sequence. Once the initial adjustment or calibration process is complete, the ASL Adaption process is disabled entirely or until the system detects a change in the operating environment (for example, a change in the temperature and/or supply voltage) or operating characteristics (for example, BER and/or operating conditions of the adaptive equalizer) of, for example, the transceivers and/or the communications channel. Thereafter, the initial adjustment or calibration process may be performed again, or may be performed periodically or intermittently, or not at all.

In one preferred embodiment, the digital section of the ASL module is responsive to two control signals. The first control signal controls the adaption process. When it is asserted, the ASL Adaption operates as described above. When the signal is not asserted, the ASL holds, suspends or maintains its up/down counter at the current value, which in turn holds or maintains the analog voltage reference levels.

The second control signal, when asserted, resets the ASL up/down counter to a default or predetermined value. In a preferred embodiment, the default or predetermined value of 749 (out of 1024) corresponds to a peak-to-peak analog reference voltage of approximately 450 mV. The second control signal has precedence over the first control signal in the preferred embodiment.

In one embodiment, the difference between the top and bottom references voltage levels of the ASL is a linear function of the digital input word, i.e., $V(6)-V(0)=\mu_{asl}*Din+minimum\_level$, where $\mu asl$ is a scale factor. Thus, if Din is 0, then $V(6)-V(0)=minimum\_level$. If Din is all ones, then $V(6)-V(0)=(2^N-1)\mu_{asl}+minimum\_level$. Other embodiments could use different scalings of the digital word, including but not limited to logarithmic, square law, and exponential.

With reference to FIG. 5, in one embodiment, the reference voltage generation portion of the ASL module includes the characteristics of: $V(6)-V(0)=I*6*(R/6)=IR$. The current labeled "I" is the current output of a DAC whose digital input is Din, the output of the up/down counter. By varying Din, the current output of the DAC (i.e., "I") is varied, and thus the range $V(6)-V(0)$ is varied. The operational amplifier at the bottom of the resistor string keeps the center reference at a desired common mode.

With reference to FIG. 6B, in another embodiment of the present invention the ASL module is configured such that level 5 and level 1 are shifted towards the center level (i.e., center or mid voltage level), level 3 in this embodiment, by ΔR %. One advantage of this arrangement is that shifting the slicer levels may improve the Bit Error Rate ("BER") of the transceiver in, for example, environments with relatively large levels of phase noise and timing jitter. In this embodiment, the ΔR % offset may be accomplished by changing the resistor values, as illustrated in FIG. 6B. The offset may also be implemented in other ways, for example, by reducing the resistance introduced by R3 and R4.

In another embodiment, the shift of level 1 and level 5 towards the center level is not uniform. In this regard, under certain conditions and/or in certain environments, the performance of the system may be enhanced by shifting level 1 and level 5 (towards the center level) by differing amounts. For example, level 5 may be shifted more towards the center level than the shift of level 1. Thus, a system having the capability of adjusting level 1 and level 5 differently (with or without feedback of the impact on the other levels) may accommodate situations in which the coding produces asymmetry in the "eye" openings from the perspective of the signal received and/or recovered by the receiver.

This embodiment may be implemented by changing the resistor values of R1, R2, R5 and R6 differently so that one level (i.e., reference voltage) is adjusted more than another. In this way, the ΔR % is not equal.

It should be noted that levels other than levels 1 and 5 may be shifted in a manner to enhance the performance of the system. In this regard, level 3 (i.e., center voltage level) may be adjusted by changing Vref. This type of configuration may also improve system performance in certain environments and/or under certain conditions.

It should be further noted that in the configuration described immediately above, the adjustment of R3 and R4 need not be equal. By adjusting R3 and R4 differently, levels 2 and 4 can be set to different adjustments relative to level 3. In this way, the slicer levels may be adjusted to address, for example, asymmetric "eye" openings (when "eye" openings are considered from the view point of the receiver).

In another embodiment, one or more levels are selectively shifted in a manner to enhance the performance of the system. For example, level 1 is shifted or adjusted by changing one or more of the resistor values R1 to R6 while the other levels are not adjusted. That is, in this example, levels 3 and 5 are unchanged while level 1 is adjusted. In another example, level 5 is shifted or adjusted and levels 1 and 3 are unchanged.

The location, positioning and determination of the slicing levels may be calculated using any of the techniques described above. Moreover, there are many other techniques for determining the slicing levels of the ASL. Thus, all techniques for determining these levels, whether now known or later developed, are intended to be within the scope of the present invention.

By shifting or adjusting one or more levels, the system has the capability of implementing many level shifting permutations in order to enhance the performance of the system for a given condition or environment. In this regard, other combinations of level shifts are possible, for example, levels 1 and 2 and/or levels 4 and 5 may be shifted. This also may be accomplished by selectively changing the resistance values of R1 to R6. In this way, the slicer levels may be adjusted to accommodate, for example, the encoding and transmission techniques that produce the asymmetric "eye" openings.

The amount or percentage of the shift of the aforementioned embodiments is also selectable or programmable. In one embodiment, a 2% or less shift may optimally enhance the performance of the system from the perspective of the BER. However, other values are also possible. In one embodiment, the amount to percentage of shift may range between 0% and 10% depending upon the needs or performance characteristics of the system for a given environment. In another embodiment, the percentage shift may be 0% to 5%. In other embodiments, the slicing levels for each level may vary between 0% and 15% to accommodate significant asymmetric disparities in the "eye" openings as observed at the receiver.

In another embodiment, the amount or percentage of the shift may also be predetermined and the levels of the slicer or the resistance of R1 to R6 may be preset or preprogrammed. In this way, the slicer adaption process provides the preprogrammed values into the ASL module, for example, during the initialization process. These values may also be "hardwired" permanently, semi-permanently or temporarily (i.e., until re-programmed) by way of a ROM, PROM, EPROM, EEPROM or the like (e.g., configuring the state of a certain pin or pins on the package).

In this embodiment, the "hardwired" values may be fixed to the values stored in, for example a ROM or EEPROM. However such values may also be fine tuned to enhance the system performance. In this regard, after (or during) the performance of an initialization or re-initialization process, the system may implement fine adjustments to the predetermined percentage of the shift to the levels or fine adjustments to the voltage levels of the slicer or the resistance of R1 to R6. The fine adjustments to the location, positioning and determination of the slicing levels may be accomplished using any of the techniques described above. Indeed, all techniques for determining these levels, whether now known or later developed, are intended to be within the scope of the present invention.

Using the above-mentioned embodiments, performance for the communications channel, as measured by the BER, may be improved. Moreover, the system may be more robust.

Figure 7:
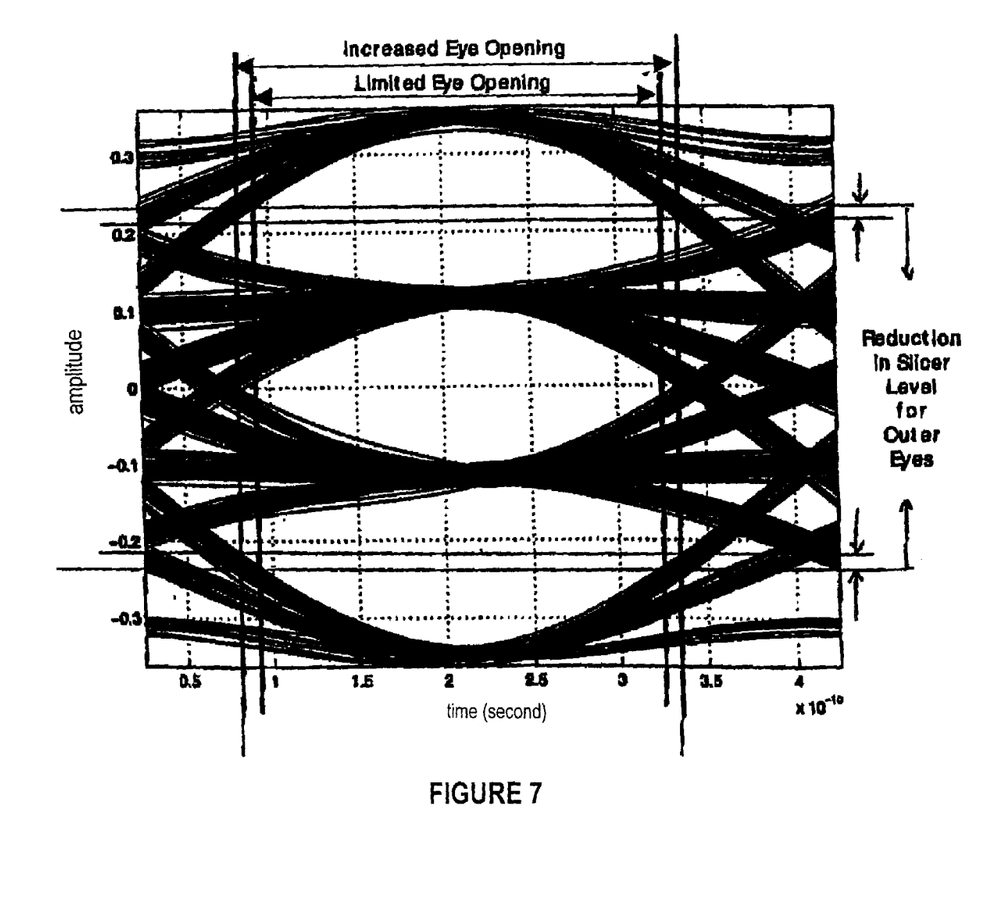
FIG. 7 illustrates a signal receiver "eye" obtained using a reference generation according to an embodiment of the present invention.

An "eye" diagram that is produced using one aspect of the present invention is illustrated in FIG. 7. In the "eye" diagram of FIG. 7, the upper and lower eye openings are wider than the center opening. The upper and lower openings are shaped somewhat like a banana (i.e., the upper opening is more curved on the top than it is on the bottom).

In contrast, if the slicer levels were centered vertically in each eye opening, as typical in conventional systems, the horizontal opening in the top and bottom eyes would be limited by the curve of the outermost traces. In fact, the horizontal opening of the upper and lower eyes would be less than the center eye.

Since the bit error rate performance is typically related to both the horizontal and vertical eye openings, the overall performance may be less than optimum or desired. In this regard, reducing the slicer levels for the outer two eyes by implementing $\Delta R \approx 2$ (i.e., a 2% change±0.2%) causes the horizontal opening to be increased, which may improve the overall BER performance.

It should be noted that the symbol coding used in generating the "eye" diagram of FIG. 7 is described in U.S. Provisional Patent Application entitled "Method and Apparatus for Encoding and Decoding Digital Communications Data", filed Aug. 20, 2001 (application Ser. No. 60/313,476) and non-provisional patent application entitled "Method and Apparatus for Encoding and Decoding Digital Communications Data", filed Aug. 16, 2002 (application Ser. No. 10/222,254). As mentioned above, these applications are incorporated by reference herein in their entirety.

FIG. 1 illustrates an example of a suitable operating environment in which the invention may be implemented. The operating environment is only one example of a suitable operating environment and is not intended to suggest any limitation as to the scope of use or functionality of the invention. Other well known computing systems, environments, and/or configurations that may be suitable for use with the invention include, but are not limited to, network equipment, backplanes, communications equipment, personal computers, server computers, hand-held or laptop devices, multiprocessor systems, microprocessor-based systems, programmable consumer electronics, network PCs, minicomputers, mainframe computers, distributed computing environments and data communication equipment that include any of the above systems or devices, and the like.

While the above embodiments of the present invention describe automatic slicer level adaption, one skilled in the art will recognize that the use of particular signal levels, particular modulation and/or encoding techniques, and particular resistor ratios are merely example embodiments of the present invention. It is to be understood that other embodiments may be utilized and operational changes may be made without departing from the scope of the present invention as recited in the attached claims.

As such, the foregoing description of the exemplary embodiments of the invention has been presented for the purposes of illustration and description. They are not intended to be exhaustive or to limit the invention to the precise circuitry or forms disclosed. Many modifications and variations, whether now known or later developed, are possible. It is intended that the scope of the invention be limited not with this detailed description, but rather by the claims appended hereto.

What is claimed is:

1. A reference generator circuit for a receiver module coupled to a digital communications channel, the reference generator circuit comprising:

a reference level generation module that generates an adjustable reference level within the receiver module;

an error measurement module, coupled to the reference level generation module, to determine an error statistic based upon a comparison between a received signal and a desired signal, wherein the error statistic is collected using a sign of a recovered datum and a sign of an error; and wherein the reference level generation module uses the error statistic to control the magnitude of the adjustable reference level.

2. The reference generator circuit according to claim 1, wherein a range of signal values is determined as corresponding to the received signal using a maximum reference level and minimum reference level; and the maximum reference level and minimum reference level are adjusted using the error statistic collected by the error measurement module.

3. The reference generator circuit according to claim 2, wherein adaption of the maximum reference level and minimum reference level can be performed without training data during an initialization process.

4. The reference generator circuit according to claim 2, wherein the maximum reference level and minimum reference level magnitude are externally set to a predetermined value.

5. A reference generator circuit according to claim 2, wherein spacing between reference levels is non-uniform.

6. The reference generator circuit according to claim 5, wherein a performance criteria for setting non-uniformity between ranges of signal values is a measure of a bit-error rate (BER) for the receiver module.

7. The reference generator circuit according to claim 1, wherein a summation is determined that includes a product of the sign of the recovered datum and the sign of the error.

8. The reference generator circuit according to claim 1, wherein the reference level generation module generates a plurality of adjustable reference levels and spacing between reference levels is non-uniform.

9. The reference generator according to claim 8, wherein the non-uniformity is asymmetric.

10. A method for a reference generator circuit for a receiver module coupled to a digital communications channel, comprising:

generating an adjustable reference level, within the receiver module, using a reference level generation module;

determining an error statistic, within an error measurement module coupled to the reference level generation module, based upon a comparison between a received signal and a desired signal, wherein the error statistic is collected using a sign of a recovered datum and a sign of an error; and adjusting the magnitude of the adjustable reference level in response to the error statistic.

11. The method of claim 10, further comprising:

determining a range of signal values as corresponding to the received signal using a maximum reference level and minimum reference level; and adjusting the maximum reference level and minimum reference level using the error statistic collected by the error measurement module.

* * * * *

UNITED STATES PATENT AND TRADEMARK OFFICE
CERTIFICATE OF CORRECTION

| | |
|---|---|
| PATENT NO. | : 7,248,640 B2 |
| APPLICATION NO. | : 10/222073 |
| DATED | : July 24, 2007 |
| INVENTOR(S) | : James Gorecki et al. |

It is certified that error appears in the above-identified patent and that said Letters Patent is hereby corrected as shown below:

On title page item 73
In the Assignee address, please delete the word "Mountian" and replace it with the word --Mountain--.

Signed and Sealed this

Second Day of October, 2007

JON W. DUDAS
*Director of the United States Patent and Trademark Office*